March 16, 1971     ÅKE EUGEN MURVALL     3,570,165
REEL FASTENING MEANS ON FISHING-ROD HANDLES
Filed Dec. 16, 1968
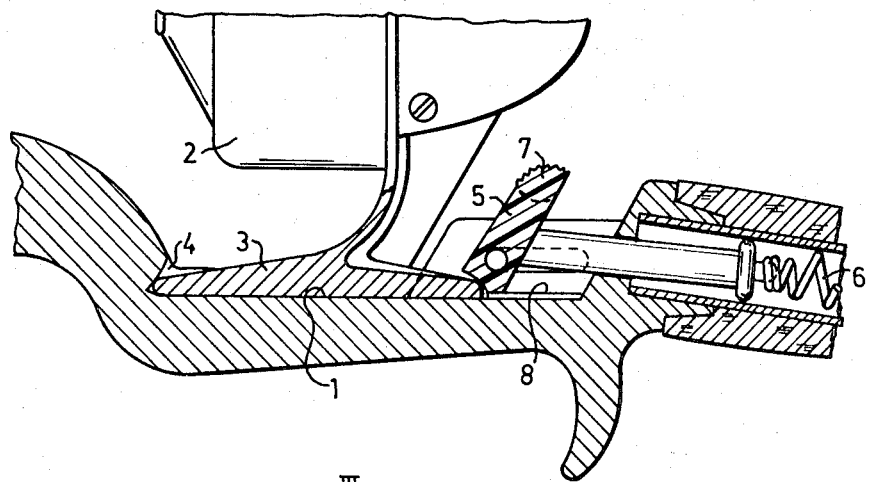
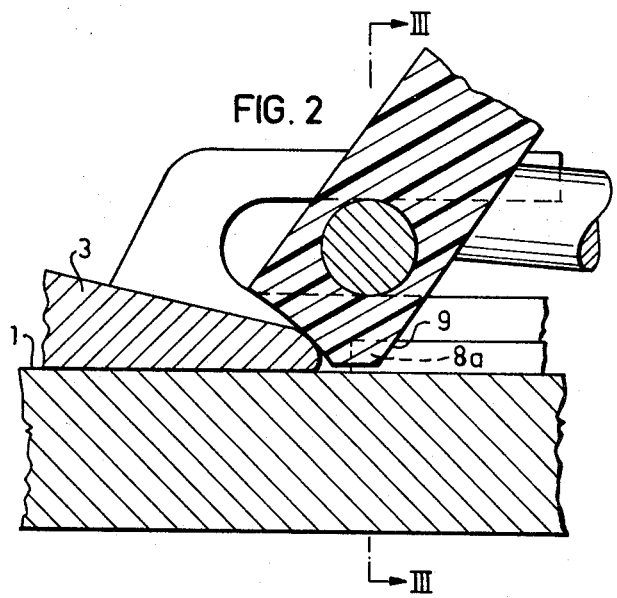
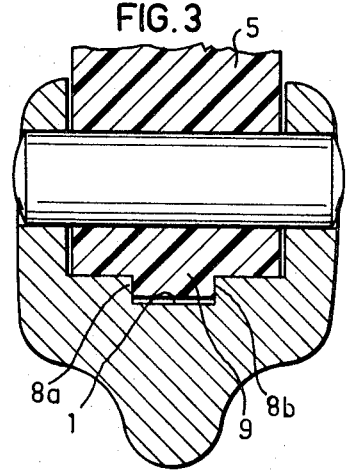
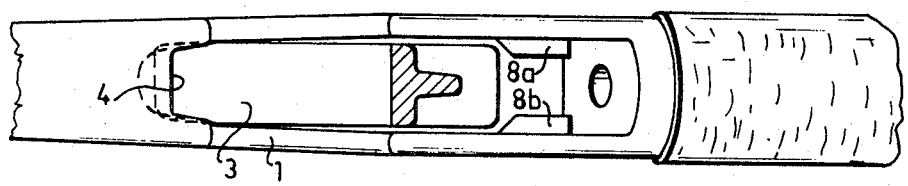

United States Patent Office 3,570,165
Patented Mar. 16, 1971

3,570,165
REEL FASTENING MEANS ON FISHING-ROD
HANDLES
Åke Eugen Murvall, Svangsta, Sweden, assignor to
Abu Aktiebolag, Svangsta, Sweden
Filed Dec. 16, 1968, Ser. No. 783,861
Claims priority, application Sweden, Dec. 22, 1967,
17,703/67
Int. Cl. A01k 87/06
U.S. Cl. 43—22                                             3 Claims

ABSTRACT OF THE DISCLOSURE

A fastening device for a fishing reel on a rod handle comprising a flat supporting surface for the base of the reel foot, an abutment recess at the forward end of the supporting surface to be engaged by the forward end of the reel foot and at the rear end of the supporting surface a locking member displaceable longitudinally of the supporting surface and actioned by a spring to press the rear end of the reel foot forwardly and downwardly onto the supporting surface. The supporting surface has at least one projection forming a stop abutment for the rear edge of the reel foot to prevent the locking member from being pushed back by the reel foot when the reel is subjected to a backwards acting force.

---

The invention refers to fastening means for reels on fishing rods. Such fastening means are known which comprise a supporting surface for the reel foot, a fixed retaining recess at the forward end of the supporting surface forming an abutment for the forward end of the reel foot and a movable locking member or abutment projecting over the rear end of the reel foot and retractable against spring action for releasing the reel foot at the rear end of the supporting surface.

With means of this kind it often happens that a fisher, when putting down his rod, hits the ground with the handle end of the rod with sufficient force to displace the reel backwards by inertia and thereby pushes the retractable abutment backwards and thus releases the reel foot from the rod.

It is a purpose of the invention to prevent such undesired releasing of the reel from the rod and to ensure a secure and fixed retention of the reel on the rod independently of varying thickness of the reel foot at its ends.

According to the invention the supporting surface behind the rear end of the reel foot in its secured position has at least one stop or projection over which the rear end of the reel foot can be moved backwards only after the retraction of the locking member.

An embodiment of the invention is illustrated in the accompanying drawing.

FIG. 1 shows a longitudinal section through the reel-fastening means.

FIG. 2 shows a detail of FIG. 1 at a larger scale.

FIG. 3 shows a section along line III—III in FIG. 2.

FIG. 4 is a plan view of the reel supporting portion of the rod handle after the locking member has been removed.

The reel fastening means comprises mainly a supporting surface 1 for the foot 3 of the reel 2. At the forward end of the supporting surface there is an abutment recess 4 in which the forward end of the reel foot 3 is engaged. At the rear end of the supporting surface there is a locking member 5 which is movable longitudinally of the supporting surface and which is pressed forwardly by a spring 6. The locking member 5 has a finger grip portion 7 by which it can be pulled backwards against the action of the spring to permit the reel to move backwards until the forward end of the foot 3 leaves the recess 4 and can be removed. The forward end of the underside of the locking member 5 facing the supporting surface 1 is inclined forwardly and upwardly and is slightly concave so that, under the action of spring 6, it presses the rear end of the foot 3 forwardly and downwardly onto the supporting surface 1.

In order to prevent the displacement backwardly of the reel by a blow on the rear end of the rod, the rear portion of the supporting surface 1 situated behind the reel foot 3 in the fastened position thereof has a projection or abutment 8 which is sufficiently high to prevent the rearward movement of the foot 3 as long as the locking member 5 maintains the rear end of the foot against the supporting surface, but which is sufficiently low to permit the backward movement of the foot over the abutment 8 after the locking member 5 has been retracted.

In practice, it will happen that the ends of the feet of certain reels are so thin that the locking member cannot press the foot end down onto the supporting surface if its underside is at the level of the upper face of the abutment 8. For this reason the abutment, according to an embodiment of the invention, consists of two ledges 8a and 8b (FIGS. 2–4) situated along the two sides of the rear portion of the supporting surface 1. A projection 9 on the underside of the locking member 5 extends between these ledges 8a and 8b to immediate proximity of the supporting surface 1 so that this projection can co-operate with the end of the reel foot 3 even if said end is thinner than the abutment ledges 8a, 8b.

The invention is of course not limited to this embodiment. Any number of ledges and projections on the rear end of the supporting surface can be provided which engage a corresponding number of grooves in the underside of the locking member.

What I claim is:

1. Fastening means for a reel on a fishing-rod handle in which the handle comprises a supporting surface for the reel foot, an abutment recess at the forward end of the supporting surface for the forward end of the reel foot, and a spring-loaded locking member at the rear end of the supporting surface having a surface extending forwardly and upwardly and adapted to press the rear end of the reel foot forwardly and downwardly and to be displaceable only rearwardly against said spring loading to release the reel foot, characterized in that the supporting surface behind the rear end of the reel foot in its fastened position has at least one projection forming an abutment for the rear end of the reel foot and over which the reel foot can be moved backwardly only after retraction of the locking member.

2. Fastening means as claimed in claim 1 in which the projection extends only over a portion of the width of the supporting surface and engages at least one corresponding groove on the underside of the locking member.

3. Fastening means as claimed in claim 2 in which the abutment is divided into two longitudinal ledges running along the two sides of the rear portion of the supporting surface, the locking member having a downward projection extending between said two ledges.

References Cited

UNITED STATES PATENTS

| 2,102,237 | 12/1937 | Kinnear | 43—22 |
| 2,289,216 | 7/1942 | Seidel | 43—22 |
| 2,443,567 | 6/1948 | Moulton | 43—22 |
| 2,583,909 | 1/1952 | Warth | 43—22 |

FOREIGN PATENTS

| 66,938 | 10/1943 | Norway | 43—22 |

SAMUEL KOREN, Primary Examiner

D. J. LEACH, Assistant Examiner